(12) United States Patent
Siewert et al.

(10) Patent No.: US 6,857,381 B2
(45) Date of Patent: Feb. 22, 2005

(54) CAM CLEAT WITH AUTOMATIC FAIRLEAD

(75) Inventors: Wayne W. Siewert, Minneapolis, MN (US); Eric E. Malkerson, Coon Rapids, MN (US)

(73) Assignee: Design Extremes, Inc., Minneapolis, MN (US)

( * ) Notice: Subject to any disclaimer, the term of this patent is extended or adjusted under 35 U.S.C. 154(b) by 57 days.

(21) Appl. No.: 10/402,300

(22) Filed: Mar. 28, 2003

(65) Prior Publication Data

US 2004/0187757 A1 Sep. 30, 2004

(51) Int. Cl.[7] ............................................... B63B 21/04
(52) U.S. Cl. ..................................................... 114/218
(58) Field of Search ........................................ 114/218

(56) References Cited

U.S. PATENT DOCUMENTS 4,620,499 A * 11/1986 Slemmons .................. 114/218

OTHER PUBLICATIONS

Quick Cleat advertisement.

* cited by examiner

Primary Examiner—Stephen Avila
(74) Attorney, Agent, or Firm—Nawrocki, Rooney & Sivertson, P.A.

(57) ABSTRACT

A cam cleat has at least one cam mounted on a base. The cam has a fairlead projection that is spaced from the base and that rotates with the cam. When the cam is in its idle position with no line gripped by a jaw of the cam, the fairlead projection is rotated out of alignment with a gripping path that a line to be gripped by the cam cleat occupies. When a line is gripped by the cam, the cam rotates into a gripping position where the fairlead projection is rotated into alignment with the gripping path. The fairlead projection is aligned with the gripping path when the line is gripped in the cam's jaw. When so aligned, the fairlead projection resists tension in the line directed upward from the cam cleat that might otherwise cause the line to slip from the grip of the cam's jaw.

14 Claims, 4 Drawing Sheets

CAM CLEAT WITH AUTOMATIC FAIRLEAD

BACKGROUND OF THE INVENTION

Particularly in boating and other nautical applications, it is frequently necessary to grip a tensioned line for periods of time. (The nautical term "line" will be used throughout to refer to the various types of flexible ropes usually suitable for manual handling.) The device used to retain tension in a line is called a cleat. A cleat should hold or grip the line securely and at the same time permit the line to be easily attached to and removed from the cleat.

Cleats of various types have been used for literally centuries. Simple cleats are mounted on a dock and have horizontally projecting arms or bars, around which a line used as a painter for mooring a boat, can be wrapped. Such cleats can hold lines securely, but attaching line to and removing lines from them takes time.

A cam cleat is another type of cleat more often used for short-term line holding and where long-term reliability is not so important. A cam cleat 10 such as shown in FIGS. 1–3 is typically used to temporarily hold a sheet (line for adjusting the force applied to a sail) or other control line. FIG. 1 shows cam cleat 10 in an idle position with no line cleated in it. FIG. 2 shows cleat 10 in an operating position with a line 30 cleated therein.

A cam cleat has a base 13 and, not surprisingly, at least one spring-loaded cam 18 mounted on base 13 for rotation about an axle 21 through a fraction of a complete turn. Cam 18 typically has an approximate cylindrical shape whose height along an axis of rotation 29 for cam 18 (see FIG. 3) may be perhaps half the largest transverse dimension. (The definition of cylinder used here is that from solid geometry as the locus of a line moving parallel to an axis to form a closed loop.) Cam 18 has a lower surface 26 adjacent to base 13 and an upper surface 25 opposite surface 26, to thereby define the volume of cam 18.

The spring loading for cam 18 is provided by a spring (not shown) that urges cam 18 in a counterclockwise direction around axle 21. A stop, also unshown, limits the counterclockwise rotation of cam 18 to approximately that shown in FIG. 1.

Cam 18 has a peripheral segment that is eccentrically mounted with respect to axle 21 and that forms a jaw 22. By "eccentrically mounted" here is meant that as cam 18 rotates about axle 21, jaw 22 swings into and out of a gripping path 28 extending along a side of cam 21. Line 30 extends along gripping path 28 when gripped by cam 18. Most often jaw 22 has a helical or spiral profile as seen in FIG. 2.

Jaw 22 is formed from a series of teeth 24 or other friction-enhancing feature that defines a gripping surface. The radial distance R for teeth 24 with respect to axle 21 increases with an increasing clockwise angle relative to axle 21. The use of a spiral profile allows cleat 10 to more easily accept a range of line diameters. The use of a plurality of teeth 24 to forming the gripping surface is typical and reduces wear on both the teeth 24 and line 30.

For some applications even a single eccentrically mounted tooth 24 forming jaw 22 on cam 18 will be sufficient to grip a line 30 and is to be included in the general definition of a cam cleat jaw 22. Of course such a single tooth cam does not have a spiral profile, but will still be generally referred to as a cam, for lack of a better term if for no other reason.

Prior art cam cleats usually have a second spring-loaded cam 19 having more or less a mirror image of clam 18. Cam 19 has a jaw 23 facing jaw 22 with the gripping path 28 running between them. The spring loading for cam 19 urges cam 19 in a clockwise direction.

In use, a line 30 is inserted between jaws 22 and 23 with a downward and backward (to the left in FIGS. 1 and 2) motion on segment 30b of line 30. Friction between line segment 30b and jaws 22 and 23 during this motion rotates cams 18 and 19 into an open position as shown in FIG. 2 allowing the downward force on line segment 30b to open cams 18 and 19 and line segment 30 to slip between jaws 22 and 23.

The spring loading creates friction between jaws 22 and 23 on the one hand and line 30 on the other. Tension T in segment 30a of line 30 as indicated by arrow 33 causes line 30 to slip slightly to the right, and the friction thus created to cause cam 18 to rotate counterclockwise slightly and cam 19 to rotate clockwise slightly. The eccentric mount of jaws 22 and 23 causes line 30 to be gripped and compressed between jaws 22 and 23 as shown in FIGS. 2 and 3. The gripping and compression limits slippage of line 30 within jaws 22 and 23 and essentially immobilizes line 30 in the direction of tension.

If tension on line 30 is high the gripping may create so much friction that line 30 cannot be easily removed from jaws 22 and 23 without releasing some of the tension that line 30 applies to cams 18 and 19. On the other hand, if line 30 tension is low, the gripping force may be so low that line 30 can easily be removed from jaws 22 and 23, perhaps even when not desired.

FIGS. 1–3 also show a fairlead 27 mounted at the opening of the jaws 22 and 23. Fairlead 27 straddles gripping path 28. Fairlead 27 serves two purposes. First, by tying a simple overhand or figure eight knot in line segment 30b that can't pass through fairlead 27, line 30 can be kept more or less permanently in position for cleating between cams 18 and 19 as needed. The knot and fairlead 27 also limit the amount of movement line 30 can undergo in the direction of the tension arrow 33.

Fairlead 27 also prevents cams 18 and 19 from releasing line 30 if the tension in line segment 30a is angled above the plane of base 13. A number of nautical situations can arise where the tension in segment 30a is directed above the plane of base 13, either temporarily or permanently. For example, if the cleat were to be used for temporarily mooring a craft to a dock, stepping on the bow might cause the bow to fall and the angle between line segment 30a and the base 13 plane to rise above the plane of base 13. The upward force component in line segment 30 may be sufficient to slip line 30 from cams 18 and 19 were it not for the fairlead 27 that keeps the angle of line segment 30 adjacent cams 18 and 19 more or less parallel to the base 13 plane.

However, a cam cleat 10 with a conventional fairlead 27 is somewhat inconvenient to use where a line is to be only temporarily clamped in the cleat. The line must first be led through fairlead 27, which takes extra time and more precise manipulation. A situation where line 30 is already under tension can often require two hands to cleat a line in a cam cleat with a fairlead 27 of the type shown. Nevertheless, a cam cleat with a fairlead is often very useful in nautical and other applications.

BRIEF DESCRIPTION OF THE INVENTION

The invention is intended to be an improvement to a conventional cam cleat for holding a line under tension. Such a cam cleat conventionally has a base for mounting on a surface.

At least a first cam having a bottom surface and a top surface opposite the bottom surface is mounted on the base on an axle for rotation between an idle position and a gripping position. The first cam's bottom surface is in proximity to the base. The first cam is substantially in the form of a cylinder having a jaw on an edge thereof. The jaw has a gripping surface eccentrically mounted with respect to the axle. The first cam is mounted on the base adjacent to a gripping path extending along the base and along which gripping path the line to be gripped by the first cam passes. The first cam's idle position places the gripping surface within the gripping path.

The improvement comprises a fairlead projection extending from the first cam's top surface and spaced from the base. The fairlead projection is adjacent to the gripping path with the first cam in the idle position. The fairlead projection is positioned within the gripping path and spaced from the base when the first cam is in the gripping position.

In the usual case, such a cam cleat includes a second cam having a bottom surface and a top surface opposite the bottom surface. The second cam is mounted also on the base on an axle for rotation between an idle position and a gripping position, and with the bottom surface in proximity to the base. The second cam is also substantially in the form of a cylinder having a jaw on an edge thereof, said jaw having a gripping surface eccentrically mounted with respect to the axle. The second cam is also mounted on the base adjacent to the gripping path and opposed to the first cam. The second cam's idle position places the gripping surface within the gripping path.

The second cam also includes a fairlead projection extending from the second cam's top surface and adjacent to the gripping path with the second cam in the idle position, said fairlead projection rotating with the second cam to a position within the gripping path and spaced from the base when the second cam is in the gripping position.

DESCRIPTION OF THE PREFERRED EMBODIMENTS

Figure 1:
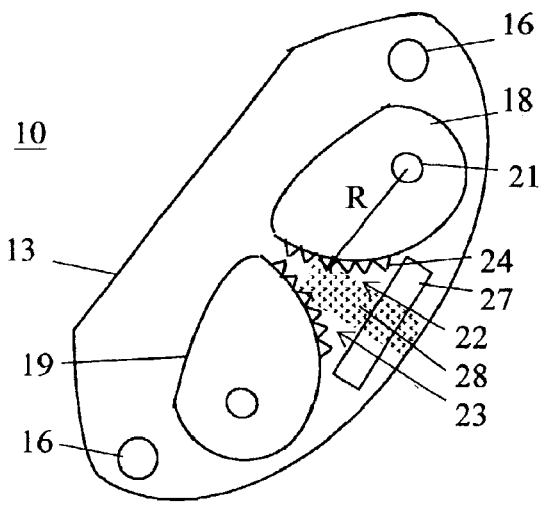
FIG. 1 is a top elevation view of a prior art cam cleat when idle.
Figure 2:
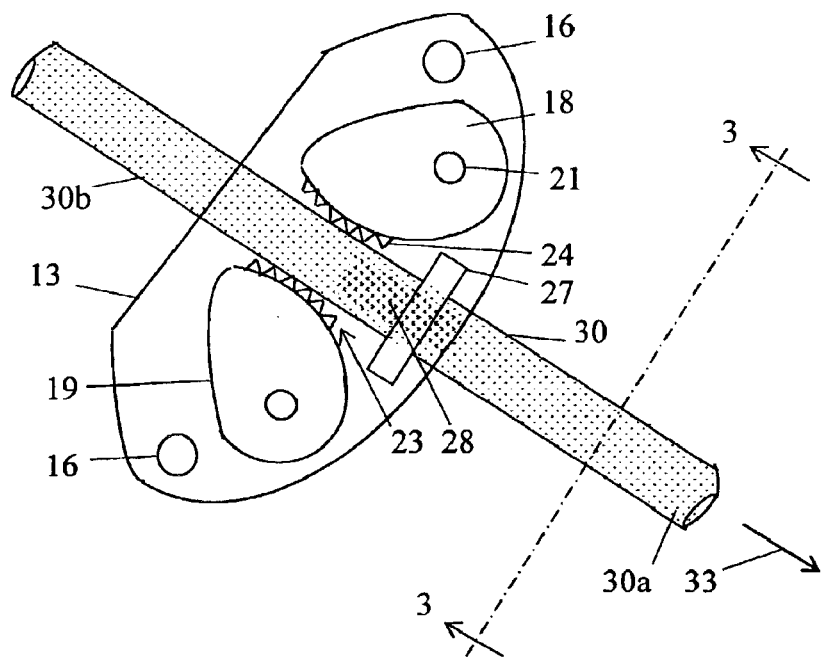
FIG. 2 is a top elevation view of the prior art cam cleat when gripping a line.
Figure 3:
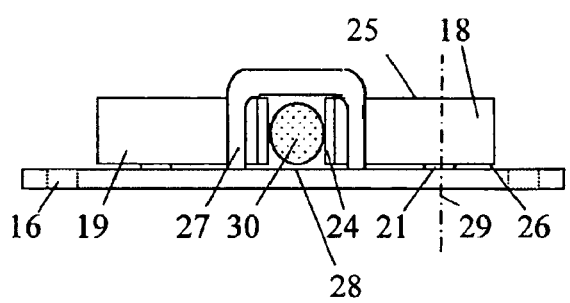
FIG. 3 is a side elevation view of a prior art cam cleat when gripping a line.
Figure 4:
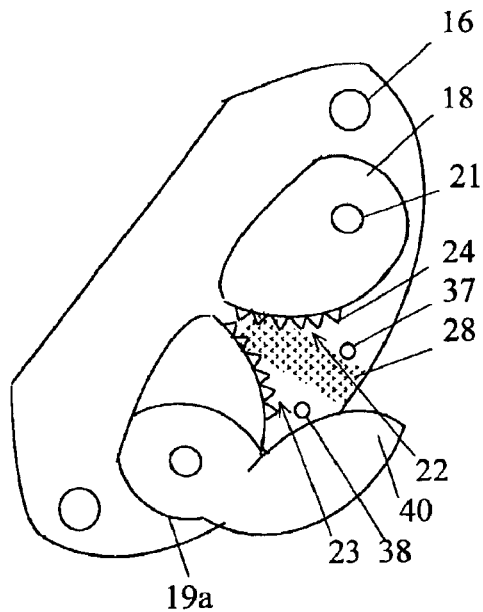
FIG. 4 is a top elevation view of a cam cleat that is idle and which has one version of the inventive feature.
Figure 5:
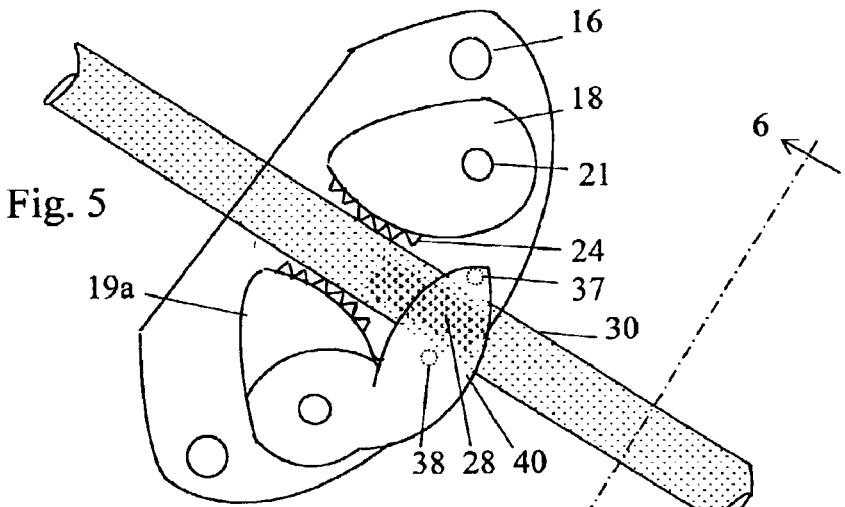
FIG. 5 is a top elevation view of a cam cleat having one version of the inventive feature and gripping a line.
Figure 6:
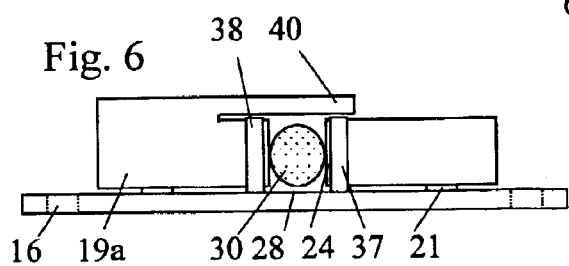
FIG. 6 is a side elevation view of a cam cleat having one version of the inventive feature and gripping a line.

Turning to FIGS. 4–6, the cam cleat shown has a first fairlead projection 40 extending from the top surface of a cam 19a and generally parallel to and spaced from the surface of base 13. Cam 19a replaces the conventional cam 19 of FIGS. 1–3. FIG. 4 shows the cam cleat in idle position with projection 40 substantially adjacent to gripping path 28 rather than within gripping path 28.

When cam 19a is rotated counterclockwise into the gripping position for cam 19a as shown in FIG. 5, fairlead projection 40 rotates with the cam 19a to a position within the gripping path 28 and spaced from base 13. When jaws 22 and 23 grip line 30, should line segment 30a be lifted above the plane of base 13 (above base 13 as shown in FIG. 6), fairlead projection 40 maintains an angle of entry into jaws 22 and 23 for line 30 that is sufficiently shallow to prevent line 30 from pulling from jaws 22 and 23 regardless of the amount of tension in line segment 30a.

Since it is possible that line element 30a can sometimes escape from a gap between the end of projection 40 and cam 18, I prefer to provide a line guide cooperating with projection 40 to retain a line within a space defined by the line guide and the first fairlead projection 40. As cam 19a rotates between the idle and gripping positions, projection arm 40 can be considered to traverse a fairlead projection path. In one version the line guide comprises a first post 37 mounted on and projecting from base 13 adjacent to gripping path 28 and on the side of gripping path 28 opposite that of the cam 19a. Post 37 projects to a point adjacent to the fairlead projection path traversed by the fairlead projection 40. Regardless of how line segment 30a is angled above base 13 (so long as line 30 is not angled past say 90° or so), fairlead projection 40 in cooperation with post 37 prevents line 30 from pulling from jaws 22 and 23.

A second post 38 may also be provided, which may assist a user when initially inserting line 30 into jaws 22 and 23. Post 38 is shown mounted on and projecting from base 13 adjacent to gripping path 28 and on the side of gripping path 28 opposite that of post 37. Posts 37 and 38 maintain alignment of line 30 with gripping path 28.

Posts 37 and 38 may be mounted on base 13 by staking or other type of secure embedding. Alternatively, a line guide with similar function may be molded into base 13. A molded line guide provides a smoother profile but may not hold line 30 quite as effectively as do posts 37 and 38 while line 30 is being inserted into jaws 22 and 23.

Figure 7:
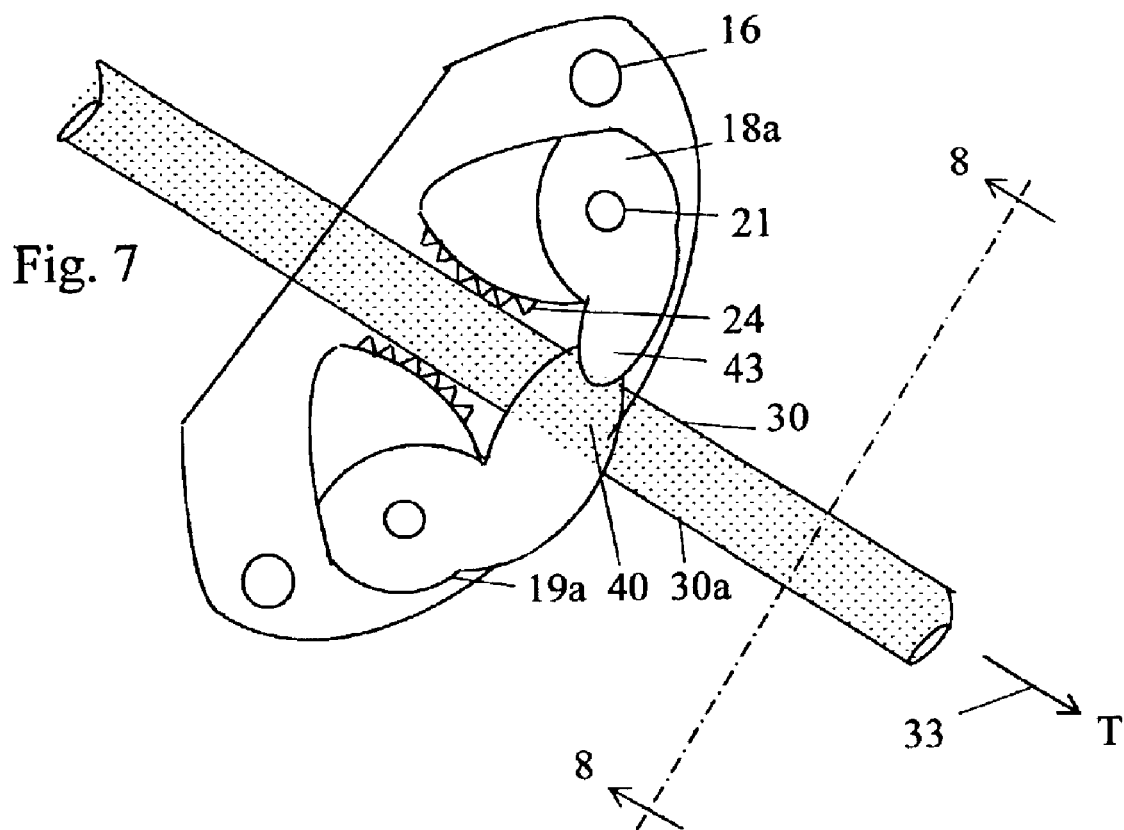
FIG. 7 is a top elevation view of a cam cleat having a variation of the inventive feature and gripping a line.
Figure 8:
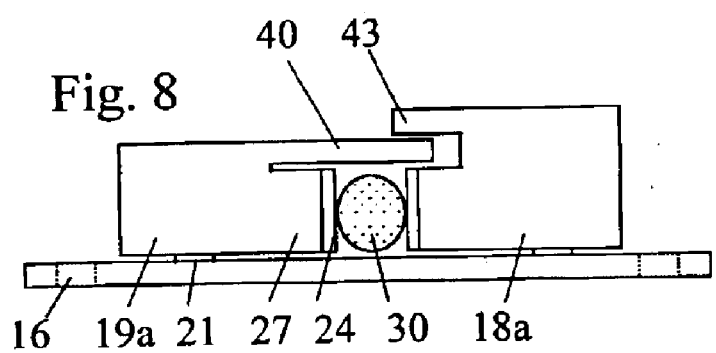
FIG. 8 is a side elevation view of a cam cleat having a variation of the inventive feature and gripping a line.
Figure 9:
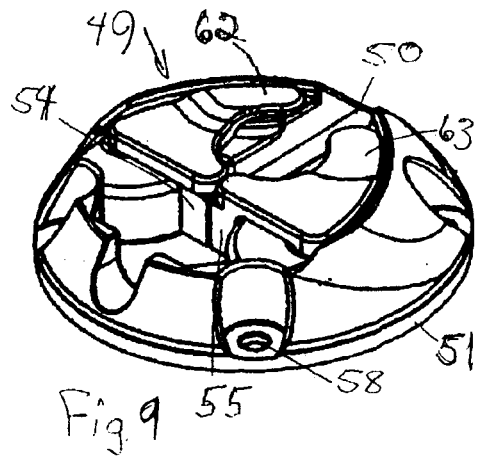
FIG. 9 is a perspective view of a proposed commercial embodiment of the invention.
Figure 10:
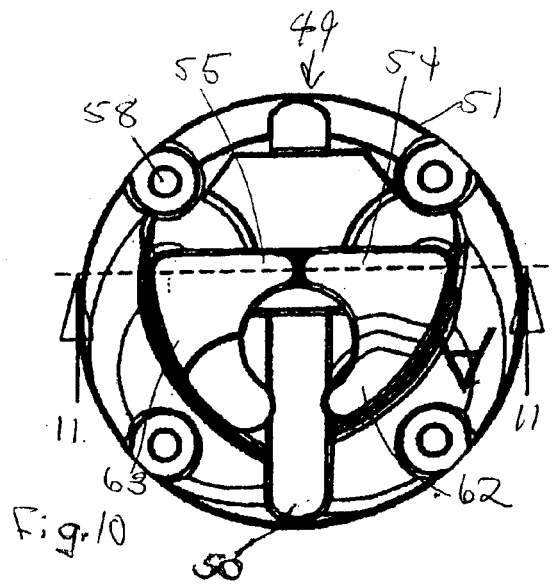
FIG. 10 is a top elevation view of the proposed commercial embodiment of the invention.

Another version of the invention is shown in FIGS. 7 and 8. A modified cam 18a has a second fairlead projection 43 extending from the top surface of cam 18 and adjacent to gripping path 28 with cam 18a in an idle position similar to that shown in FIG. 1 for cam 18 therein. When cam 18a is rotated to the gripping position, second fairlead projection 43 rotates with cam 18a to a position aligned with gripping path 28 and spaced from base 13. The second fairlead projection 43 extends from cam 18a generally parallel to base 13.

In one preferred embodiment, the first and second fairlead projections 40 and 43 overlap when the first and second cams 19a and 18a are in their respective gripping positions as shown in FIGS. 6 and 7. Preferably, the first and second fairlead projections 40 and 43 are in near-touching proximity when first and second cams 19a and 18a are in their respective gripping positions. Projection 43 provides added strength to projection 40 to resist upward force provided by tension T should this tension be directed at an angle upwards from the plane of base 13. A line guide as shown in FIGS. 4–6 may not be needed for this embodiment.

FIGS. 9–13 show a proposed commercial version of the invention. Referring first to FIGS. 9–12, a cleat 49 comprises a base 51 carrying cams 54 and 55 having jaws 64 and 65 respectively. Cleat 49 can be mounted on a surface using recessed holes as at 58.

A trough 50 aligned with the point at which jaws 64 and 65 meet when no line is clamped in them serves as a line guide to direct a line to be cleated into jaws 64 and 65. Fairlead projections 62 and 63 are carried by cams 54 and 55. When no line is held by cams 54 and 55, fairlead projections 62 and 63 leave trough 50 uncovered.

When a line is inserted into cam jaws 64 and 65, cams 54 and 55 rotate, causing fairlead projections 62 and 63 to cover trough 50, securing the line within trough 50. Should the angle at which the cleared line lift the line above the plane of base 51, fairlead projections 62 and 63 retain the line within trough 50.

The overall shape of cleat 49 is intended to provide a smooth profile with no projections that are painful to step on or that can snag another line that may be drawn across cleat 49.

It is true that cams 54 and 55 will release a cleared line when the tensioned end of the line is pulled completely over cleat 49 so that pressure from the line rotates cams 54 and 55 into a more open position. However, the presence of the line continues to hold fairlead projections 62 and 63 in a position covering trough 50. If the end of the line is knotted, the knot will prevent the line from completely escaping cleat 49.

Figure 11:
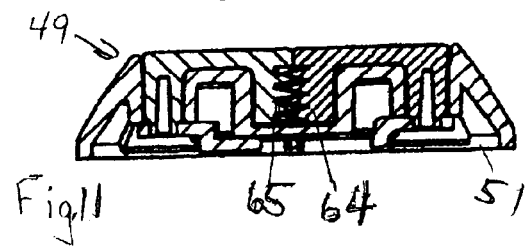
FIG. 11 is a side section of the proposed commercial embodiment of the invention.
Figure 12:
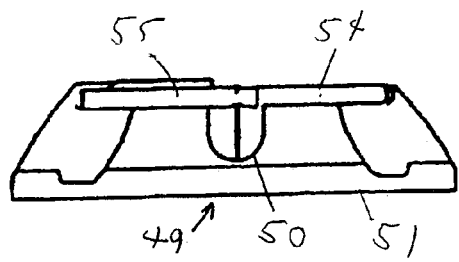
FIG. 12 is a side elevation view of the proposed commercial embodiment of the invention.

FIG. 11 shows the structure of jaws 64 and 65 as comprising vertical rows of horizontally projecting teeth. While some cam designs avoid such aggressive jaw topology, we feel that for the hard, braided nylon line often used to hold various fishing tools, such pointed teeth hold more securely. One can see from FIG. 9 that this embodiment has two or more vertical rows of such teeth.

Figure 13:
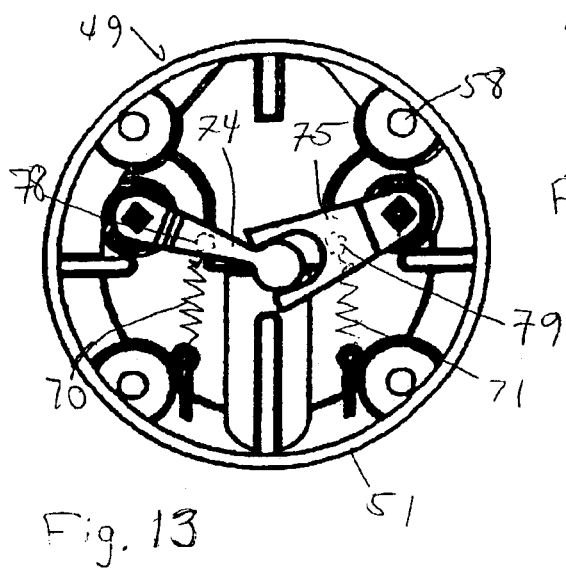
FIG. 13 is a bottom elevation view of the proposed commercial embodiment of the invention.

FIG. 13 shows a linkage under base 51 for coupling together the opening rotation of cams 54 and 55. The linkage comprises arms 74 and 75 fixed to cams 54 and 55 respectively to rotate with them. Springs 70 and 71 are connected between posts 78 and 79 on arms 74 and 75 respectively and projections of base 51 to provide force constantly urging jaws 64 and 65 to close. The ends of arms 74 and 75 terminate in an enmeshed ball and a U-channel respectively, and that together form what we call a ball-channel yoke. One can easily see that the ball-channel yoke essentially forms a simplified gear set that couples arms 74 and 75 together for rotation for a fraction of one revolution. A cover will normally be provided for the bottom of base 51 to prevent interference with the linkage.

Arms 74 and 75 rotate together with opposite rotation to provide the opening rotation for cams 54 and 55. If either of the cams 54 or 55 is rotated into an open position, the linkage provided by arms 74 and 75 cause the other of cams 54 and 55 to rotate into an open position as well. In addition, should one of the springs 70 or 71 fail for any reason, the arm 74 and 75 linkage allows the remaining spring to still operate to close both cams 54 and 55.

What is claimed is:

1. A cam cleat for holding a line under tension, said cam cleat having i) a base for mounting on a surface; and ii) a first cam having a bottom surface and a top surface opposite the bottom surface, said first cam mounted on the base on an axle for rotation between an idle position and a gripping position, and with the bottom surface in proximity to the base, said first cam substantially in the form of a cylinder having a jaw on an edge thereof, said jaw having a gripping surface eccentrically mounted with respect to the axle, and said first cam mounted on the base adjacent to a gripping path extending along the base and along which gripping path the line to be gripped by the first cam passes, said first cam's idle position placing the gripping surface within the gripping path, wherein the improvement comprises a first fairlead projection extending from the first cam's top surface and adjacent to the gripping path with the first cam in the idle position, said first fairlead projection rotating with the first cam to a position aligned with the gripping path and spaced from the base when the first cam is in the gripping position; and wherein the first fairlead projection extends from the first cam generally parallel to the base and traverses a first fairlead projection path as the cam rotates between the idle and gripping positions.

2. The cam cleat of claim 1, including a line guide mounted on the base and adjacent to the gripping path, said line guide cooperating with the first fairlead projection to retain a line within a space defined by the line guide and the first fairlead projection.

3. The cam cleat of claim 2, wherein the line guide extends from the base to a point adjacent to the first fairlead projection path and adjacent to the gripping path.

4. The cam cleat of claim 3, wherein a pair of, wherein one post is positioned to each side of the gripping path.

5. The cam cleat of claim 3, wherein the line guide comprises a channel integral with the base through which the gripping path passes.

6. The cam cleat of claim 2, wherein the line guide comprises a post projecting from the base adjacent to the gripping path and on the side of the gripping path opposite that of the first cam.

7. The cam cleat of claim 1, including a second cam having a bottom surface and a top surface opposite the bottom surface, said second cam mounted on the base on an axle for rotation between an idle position and a gripping position, and with the bottom surface in proximity to the base, said second cam substantially in the form of a cylinder having an jaw on an edge thereof, said jaw having a gripping surface eccentrically mounted with respect to the axle, and said second cam mounted on the base adjacent to the gripping path and opposed to the first cam, said second cam's idle position placing the gripping surface within the gripping path, wherein the second cam includes a second fairlead projection extending from the second cam's top surface and adjacent to the gripping path with the second cam in the idle position, said second fairlead projection rotating with the second cam to a position within the gripping path and spaced from the base when the second cam is in the gripping position.

8. The cam cleat of claim 7, wherein the second fairlead projection extends from the second cam generally parallel to the base.

9. The cam cleat of claim 8, wherein the first and second fairlead projections overlap when the first and second cams are in their respective gripping positions.

10. The cam cleat of claim 9, wherein the first and second fairlead projections are in near-touching proximity when the first and second cams are in their respective gripping positions.

11. The cam cleat of claim 7, wherein a linkage attached to the first and second cams couples opening rotation of one cam to the other.

12. The cam cleat of claim 11, wherein the linkage comprises a first arm connected to rotate with the first cam, and a second arm connected to rotate with the second cam, said arms coupled and the ends thereof to rotate together with opposite rotation.

13. The cam cleat of claim 12, wherein the ends of the first and second arms form a ball-channel yoke.

14. A cam for a cam cleat for holding a line under tension, said cam having a bottom surface and a top surface opposite the bottom surface, said cam to be mounted in proximity to a base on an axle for rotation about an axis of rotation between an idle position and a gripping position, said cam substantially in the form of a cylinder having an jaw on an edge thereof, said jaw having a gripping surface eccentrically mounted with respect to the axle, and said cam to be mounted on the base adjacent to a gripping path aligned with the cam's gripping surface and along which gripping path the line to be gripped by the cam passes, said cam's idle position placing the gripping surface within the gripping path, wherein the improvement comprises a fairlead projection extending from the cam's top surface and adjacent to the gripping path with the cam in the idle position, said fairlead projection rotating with the cam to a position aligned with the gripping path and spaced from the base when the cam is in the gripping position; and wherein the fairlead projection extends from the cam generally orthogonal to the axis of rotation.

* * * * *